(12) United States Patent
Brewer

(10) Patent No.: US 10,936,831 B2
(45) Date of Patent: Mar. 2, 2021

(54) DIGITAL CARD-READER AND HUB

(71) Applicant: ProGrade Digital Incorporated, San Jose, CA (US)

(72) Inventor: Wes Brewer, San Jose, CA (US)

(73) Assignee: ProGrade Digital Incorporated, San Jose, CA (US)

( * ) Notice: Subject to any disclaimer, the term of this patent is extended or adjusted under 35 U.S.C. 154(b) by 238 days.

(21) Appl. No.: 16/146,478

(22) Filed: Sep. 28, 2018

(65) Prior Publication Data

US 2020/0104548 A1 Apr. 2, 2020

(51) Int. Cl.
| | | |
|---|---|---|
| *G06K 7/00* | (2006.01) | |
| *G11B 5/008* | (2006.01) | |
| *G06K 7/08* | (2006.01) | |
| *G06K 7/06* | (2006.01) | |

(52) U.S. Cl.
CPC ............ *G06K 7/0021* (2013.01); *G06K 7/06* (2013.01); *G06K 7/084* (2013.01); *G11B 5/00808* (2013.01)

(58) Field of Classification Search
CPC ........ G06K 7/0021; G06K 7/084; G06K 7/06; G11B 5/00808
See application file for complete search history.

(56) References Cited

U.S. PATENT DOCUMENTS 9,135,478 B2 * 9/2015 Burns .................. G06K 7/0021

OTHER PUBLICATIONS

Wilhelm, Eric, "Magnetic Use Card Reader", Instructables, [Online]. Retrieved from the Internet: <URL: http://www.instructables.com/id/Magnetic-USB-card-reader/>, (Accessed Oct. 24, 2018), 5 pgs.

* cited by examiner

*Primary Examiner* — Sonji N Johnson
(74) *Attorney, Agent, or Firm* — Schwegman Lundberg & Woessner, P.A.

(57) ABSTRACT

Various embodiments include, for example, a digital-card reader, a reader hub, and a method of determining a coefficient of friction for mounting the digital-card reader and the reader hub to a mounting surface. In one specific embodiment, the digital-card reader includes a card-reader frame having a circuit board including at least one memory-card reader to perform data transfer operations; a magnetic material coupled to at least one face of the card-reader frame; and a compliant-region mat coupled to the at least one face of the card-reader frame and positioned proximate to the magnetic material. The magnetic material compresses the compliant-region mat to increase friction against a mounting surface to at least partially overcome insertion forces associated with inserting the memory card into the digital-card reader to reduce or eliminate lateral movement of the digital-card reader with reference to the mounting surface. Other devices, apparatuses, and methods are described.

18 Claims, 4 Drawing Sheets

DIGITAL CARD-READER AND HUB

TECHNICAL FIELD

Embodiments described herein relate generally to digital memory cards and devices for writing to or reading to the memory cards. More specifically, the disclosed subject matter relates to an apparatus comprising a digital card-reader arranged to be attached magnetically to a metallic surface (e.g., the cover of a laptop or side of a desktop computer) or to one or more other similar digital card-reader apparatuses. The disclosed subject matter further relates to an apparatus comprising a reader hub arranged to be attached magnetically to a metallic surface or to one or more other similar reader hub apparatuses.

BACKGROUND

Digital memory cards are known in the art and are used for storing, for example, data from cinematography, videography, and still photography. The data stored on these memory cards can comprise extremely large datasets (e.g., 512 gigabytes (GB) or higher). Contemporaneous card readers are subject to lateral movement whenever a memory card is inserted or removed from the card reader.

The information described in this section is provided to offer the skilled artisan a context for the following disclosed subject matter and should not be considered as admitted prior art.

BRIEF DESCRIPTION OF THE DRAWINGS

In the drawings, which are not necessarily drawn to scale, like numerals describe substantially-similar components throughout the several views. Like numerals having different letter suffixes represent different instances of substantially-similar or related components. The drawings illustrate generally, by way of example, but not by way of limitation, various embodiments discussed in the present document.

DETAILED DESCRIPTION

Reference will now be made in detail to certain embodiments of the disclosed subject matter, examples of which are illustrated in part in the accompanying drawings. Other embodiments may incorporate structural, logical, electrical, process, and other changes. Portions and features of some embodiments may be included in, or substituted for, those of other embodiments. While the disclosed subject matter will be described in conjunction with the enumerated claims, it will be understood that the disclosed subject matter is not intended to limit the claims to the disclosed subject matter.

In various embodiments, the disclosed subject matter relates to digital-card readers used to transfer data used in cinema, video, and photography workflows, as well as workflows in related fields. The workflows include any environment in which large volumes (e.g., 512 GB or more) of data files are stored on memory cards, such as, for example, but not limited to, secure digital cards (SD) and various types of CompactFlash cards including XQD and CFast cards. In various embodiments, the digital-card reader may have two or more slots into which a variety of digital cards may be inserted and read from or written to simultaneously. In various embodiments, the digital-card reader may magnetically be attached to metallic surfaces of laptop or desktop computers, or to other similarly-formed digital-card readers or reader hubs.

Figure 1:
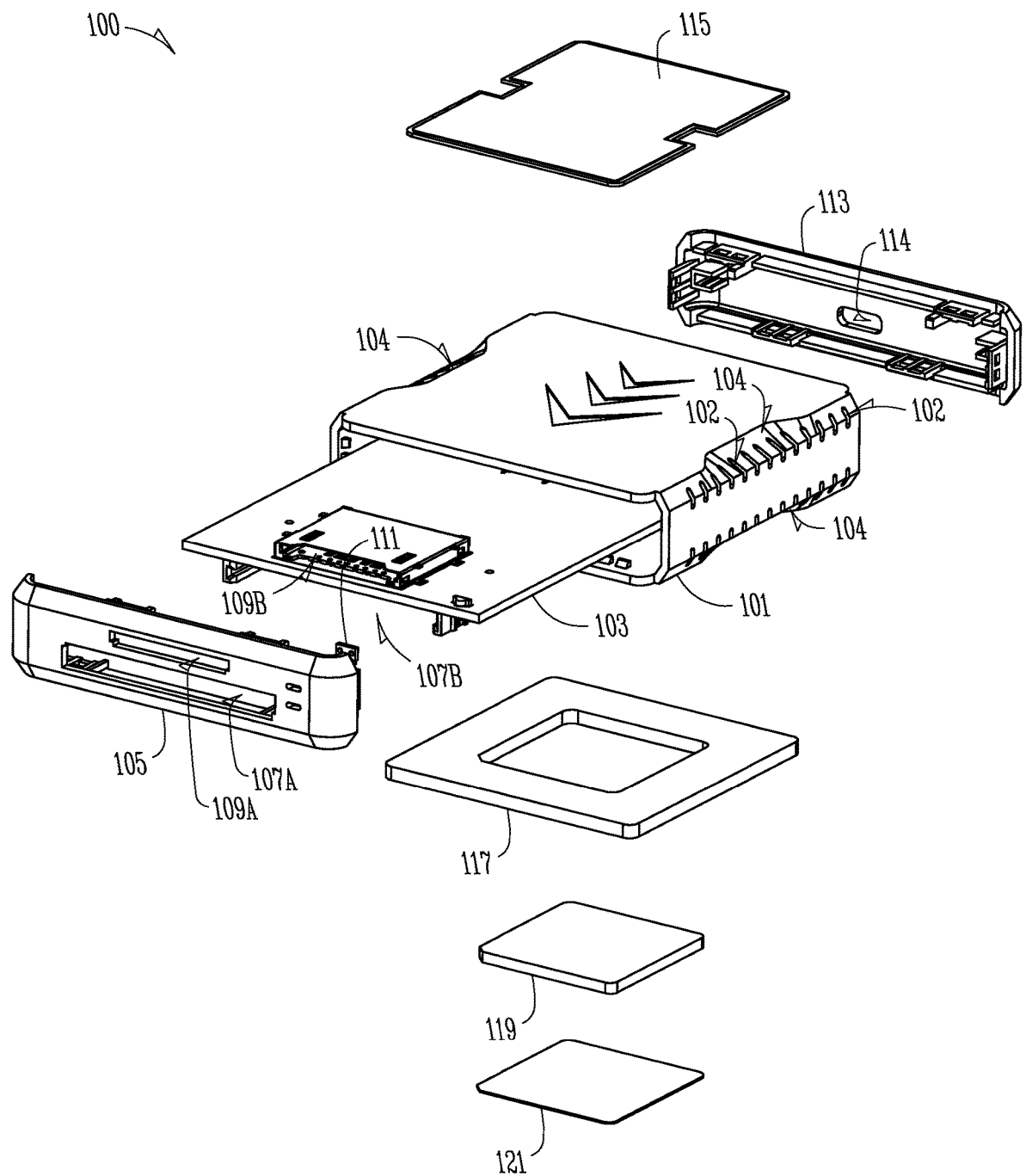
FIG. 1 shows as an exploded-view drawing of an exemplary embodiment of a digital-card reader in accordance with various embodiments of the disclosed subject matter.

With reference now to FIG. 1, an exploded-view drawing of an exemplary embodiment of a digital-card reader 100 in accordance with various embodiments of the disclosed subject matter is shown. The digital-card reader 100 is shown to include a card-reader frame 101, a dual card-reader circuit-board 103, a front cover 105 for the card-reader frame 101, and back cover 113 for the card-reader frame 101.

The card-reader frame 101 can be constructed from a variety of materials including, for example, metals, plastics, ceramics, and other materials known in the art. The card-reader frame 101 can be machined, extracted, cast, or otherwise fabricated from one or more materials known in the art or described herein. In various embodiments, the front cover 105 and the back cover 113 can be fabricated from materials and formation techniques similar to those used to fabricate the card-reader frame 101. In other embodiments, the front cover 105 and the back cover 113 can be fabricated from materials and formation techniques different from those to those used to fabricate the card-reader frame 101. For example, the card-reader frame 101 may be machined from type 304 stainless steel while the front cover 105 and the back cover 113 may be formed from a thermosetting polymer (e.g., a thermosetting plastic or a thermosetting resin). Once formed with the dual card-reader circuit-board 103 inserted within the card-reader frame 101, each of the card-reader frame 101, the front cover 105, and the back cover 113 may be attached to one another by, for example, mechanical components (e.g., screws, rivets, or bolts), by chemical-bonding techniques (e.g., adhesive bonding), brazing, welding, or other techniques known in the art that are suitable based at least on the materials from which the components are formed.

The card-reader frame 101 includes a number of through-hole vents 102 to allow convective cooling of the dual card-reader circuit-board 103. A person of ordinary skill in the art will recognize, based upon reading and understanding the disclosure provided herein, that a convective cooling load, and thereby a number and size of the through-hole vents 102, can be calculated based on a pre-determined heat load generated by the dual card-reader circuit-board 103 in various operating conditions and various ambient environments typically encountered. The calculations can readily be performed based on principles of heat transfer and thermodynamics, known in the art.

The card-reader frame 101 also includes a number of gripping indents 104. The gripping indents 104 allow an end-user to grasp more readily the digital-card reader 100 when picking up and moving the digital-card reader 100, or separating the digital-card reader 100 from another surface to which the digital-card reader 100 has been attached magnetically.

Although FIG. 1 indicates that there are two memory-card readers, the dual card-reader circuit-board 103 term is chosen merely to illustrate more readily an exemplary embodiment of the digital-card reader 100. In various embodiments, the dual card-reader circuit-board 103 may include at least one or more memory-card readers configured to perform data transfer operations. The data transfer operations include at least one of reading from the memory card and writing to the memory card.

In various embodiments, the back cover 113 may include an opening 114 through which a computer or other digital device may be electrically coupled to the dual card-reader circuit-board 103 within the digital-card reader 100. Although only one opening 114 is shown, the skilled artisan will recognize that any number of openings 114 may be formed through the back cover 113. The opening 114 allows access from the dual card-reader circuit-board 103 to, for example, an electrical bus, such as a universal serial bus (USB, including, e.g., USB-A and USB-C®) to be coupled electrically to an external electronic device, such as a laptop or desktop computer, or a digital camera (e.g., a video camera, a digital single-lens reflex (DSLR) camera, a mirrorless camera, etc.).

In some embodiments (not shown but understandable to a skilled artisan), there may be no direct connections between a computer or other digital device and the digital-card reader 100. For example, rather than having a direct, hardwired electrical-connection between the computer or other digital device, the digital-card reader 100 and the computer may be coupled wirelessly via, for example, radio-frequency (RF), Bluetooth®, or one or more other types of wireless communication means known in the art.

In various embodiments, the front cover 105 has a number of through-holes including a first through-hole 107A and a second through-hole 109A. Although the first through-hole 107A is shown to be larger than the second through-hole 109A, there is no requirement for such an arrangement. Nor is there any requirement for precisely two through-holes. For example, there may be only a single through-hole or more than two through-holes. In various embodiments, each of the through-holes 107A, 109A may be the same size. In other embodiments, the through-hole 107A may be smaller than the through-hole 109A. Regardless of their number and relative sizes, each of the through-holes 107A, 109A is positioned to align with a first card-reader 107B (not shown explicitly) and a second card-reader 109B, both located on the dual card-reader circuit-board 103.

In various embodiments, the dual card-reader circuit-board 103 includes two card readers. Each of the card readers may be configured to read the same or different types and sizes of memory card (e.g., one card reader may be configured to read a CFast card and the other may be configured to read an XQD card). In other embodiments, both card readers may be configured to read, for example, XQD cards or other types of memory cards. In other embodiments, not shown but understandable to a person of ordinary skill in the art based on upon reading and understanding the disclosure provided herein and despite the name given for ease of understanding, the dual card-reader circuit-board 103 may include more than two card readers.

Also shown in FIG. 1 are a compliant-region mat 117 and a magnetic material 119. Although not shown explicitly, the 117 does not need entirely to surround the magnetic material 119 as shown in FIG. 1. In some embodiments, the compliant-region mat 117 may be formed on opposite sides of the magnetic material 119. In some embodiments, the compliant-region mat 117 is approximately the same thickness as the magnetic material 119.

The compliant-region mat 117 may comprise various types of flexible elastomers, rubbers, polymers, plastics, and related soft materials. The compliant-region mat 117 serves at least two purposes. First, the compliant-region mat 117 comprises a relatively soft material to prevent scratching surfaces to which the digital-card reader 100 is to be affixed (e.g., a cover of a laptop computer, the side of a desktop computer, or other metallic mounting-surface). Secondly, the compliant-region mat 117 comprises a compressible material such that, when the digital-card reader 100 is affixed to a metallic mounting-surface via the magnetic material 119, the magnetic material 119 at least partially overcomes insertion forces associated with inserting a digital card into the digital-card reader 100, thereby reducing or eliminating a lateral movement (e.g., sliding) of the digital-card reader 100 across the metallic mounting-surface. Therefore, the compliant-region mat 117 may be compressed by the magnetic material 119 against the metallic mounting surface to increase friction, and thereby limit or prevent lateral movement or sliding, of the digital-card reader 100 relative to the metallic mounting surface. As is known to a person of ordinary skill in the art, a dimensionless scalar-value, the coefficient-of-friction, defines a ratio of the force of friction between two surfaces and the force acting to attract the two surfaces together. The skilled artisan will therefore recognize how to calculate the coefficient-of-friction to thereby limit lateral movement between the two surfaces and as defined in more detail below.

In some embodiments, the compliant-region mat 117 may be thicker than the magnetic material 119 in a range of about 0.1 mm to about 0.5 mm. In other embodiments, the compliant-region mat 117 may be thicker than the magnetic material 119 in a range of about 0.5 mm to about 1 mm. In still other embodiments, the compliant-region mat 117 may be thicker than the magnetic material 119 in a range of about 1 mm to about 2 mm or more. Based upon reading and understanding the disclosure provided herein, a person of ordinary skill in the art will understand that a range of relative thicknesses between the compliant-region mat 117 and the magnetic material 119 may be considered based on a consideration of at least the Shore-durometer hardness-level of the compliant-region mat 117, as discussed in more detail below.

In addition to the Shore-durometer hardness-level of the compliant-region mat 117, other considerations may include a relative coefficient of static friction (a scalar quantity known and understood by a skilled artisan). The coefficient of static friction may comprise various factors known in the art such as texture (e.g., relative roughness caused by asperities in touching surfaces of adjacent materials) of the various surfaces onto which the digital-card reader 100 may be mounted, the compression with which the digital-card reader 100 is subjected (e.g., the magnetic force between the magnetic material 119 and an anticipated surface onto which the digital-card reader 100 may be mounted, coupled with any other compressive forces (e.g., a mass to which the digital-card reader 100 may be subjected)), adhesive forces between the digital-card reader 100 and various surfaces to which the digital-card reader 100 is applied, and so on. Each of these factors is known and appropriate calculations are known and may be considered and calculated by a skilled artisan.

In various exemplary embodiments, a Shore A-scale hardness of the compliant-region mat 117 may be in a range of about 40 to about 65. In various exemplary embodiments, a Shore A-scale hardness of the compliant-region mat 117 may be in a range of about 50 to about 70. In a specific exemplary embodiment, a Shore A-scale hardness of the compliant-region mat 117 may be about 60.

In various exemplary embodiments, a magnetic-flux density (magnetic strength) of the magnetic material 119 may be in a range of about 100 Gauss to about 10,000 Gauss. In various exemplary embodiments, a magnetic-flux density of the magnetic material 119 may be in a range of about 1,000 Gauss to about 5,000 Gauss. In a specific exemplary embodiment, the magnetic-flux density of the magnetic material 119 may be in a range of about 2,250 Gauss to about 2,750 Gauss.

In a specific exemplary embodiment, the magnetic material 119 is chosen to have a magnetic flux density (Gauss) large enough to overcome insertion forces associated with inserting a digital card into the digital-card reader 100. A person of ordinary skill in the art will recognize how to determine the insertion forces (e.g., measured empirically) and calculate a desired magnetic flux density that is greater than or equal to the insertion force. In other embodiments, . . . magnetic flux density combined with shear resistance due to the compliant-region mat 117.

In embodiments where the card-reader frame 101 is not fabricated from a ferrous material (e.g., a magnetic material), an optional metal plate 115 may be fastened or otherwise adhered to an uppermost portion of the card-reader frame 101 in order to stack multiple ones of the digital-card reader 100, one atop another or to another surface. In various embodiments, the optional metal plate 115 may be fastened to the card-reader frame 101 by various types of mechanical fasteners as described herein and as are known to a skilled artisan. In other embodiments, optional metal plate 115 may be adhered to the card-reader frame 101 by chemical means, such as adhesive surfaces or other adhesive materials.

The magnetic material 119 may comprise any one or more of a number of magnetic materials known in the art. For example, the magnetic material 119 may comprise ceramic magnets, aluminum/nickel/cobalt (Alnico) magnets, rare-earth magnets. or other types of magnets known in the art.

FIG. 1 is also shown to include an optional compliance-label 121. The optional compliance-label 121 can be used to indicate compliance with one or more governmental agencies that regulate communications and radiation standards. Such governmental agencies include, for example, the European Commission of the European Union (the CE standard), the United States-based Federal Communications Commission (the FCC standard), and the Canadian Standards Association (the CSA standard).

Figure 2A:
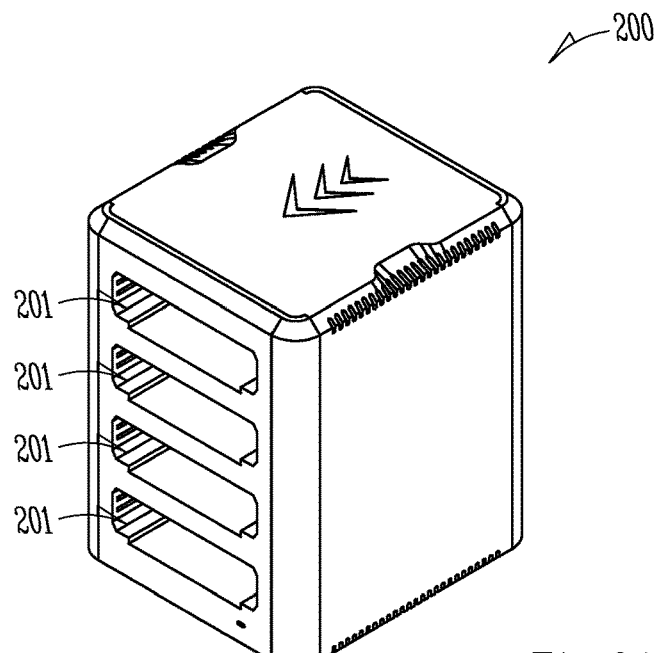
FIG. 2A shows a perspective view of an exemplary reader hub arranged to have multiple ones of the digital-card reader, in accordance with FIG. 1, inserted therein.

FIG. 2A is a perspective view of an exemplary reader hub 200 arranged to have multiple ones of the digital-card reader 100 of FIG. 1 inserted therein. The exemplary reader hub 200 is shown to include a number of openings 201 sized to accommodate the digital-card reader 100. Although FIG. 2A shows four openings 201, the skilled artisan will recognize that the exemplary reader hub 200 may include any number of openings of two or more.

The exemplary reader hub 200 allows an end user to insert a number of the digital-card readers 100 (up to four in accordance with the example shown in FIG. 2A, but, as noted above, the exemplary reader hub 200 may include any number of openings of two or more) to allow data to be transferred to and from the digital-card readers 100 simultaneously at a high rate of data transfer (the electronics governing the data transfer are known independently in the art).

Figure 2B:
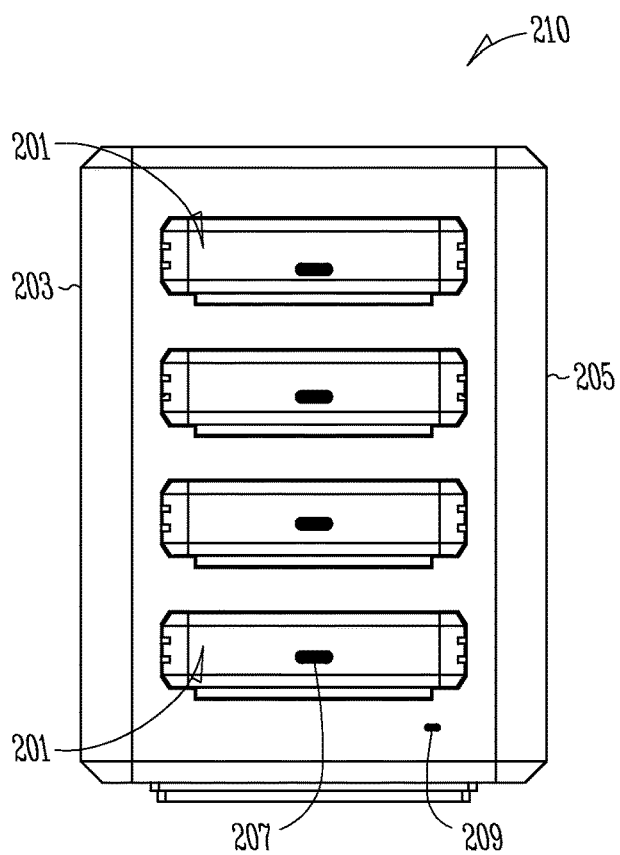
FIGS. 2B through 2F show various elevational and plan-view drawings of an embodiment of the exemplary reader hub in accordance with FIG. 2A.

FIG. 2B is a front elevational-view drawing 210 of the exemplary reader hub 200 of FIG. 2A, which includes a left-side portion 203 and a right-side portion 205. The front elevational-view drawing 210 is also shown to include an optional power indicator light 209 and a number of electrical connectors 207 configured to electrically couple each of inserted ones of the digital-card reader 100 through the opening 114 to the dual card-reader circuit-board 103 (see FIG. 1). In an alternative embodiment, the electrical connectors 207 may be wireless access points (e.g., antennas) to couple each of a number of inserted ones of the digital-card readers 100 wirelessly to the exemplary reader hub 200.

Figure 2C:
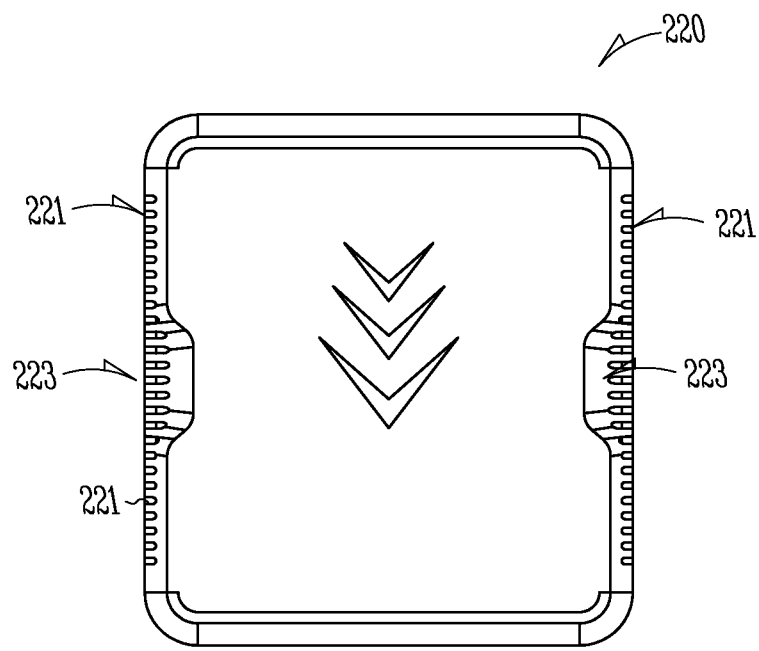

FIG. 2C is a top plan-view 220 of the exemplary reader hub 200 of FIG. 2A. The top plan-view 220 is shown to include a number of through-hole vents 221 and gripping indents 223. The through-hole vents 221 assist in cooling inserted ones of the digital-card readers 100 (e.g., by convective cooling). The gripping indents 223 allow an end-user to grasp more readily the exemplary reader hub 200 when picking up and moving the exemplary reader hub 200.

Figure 2D:
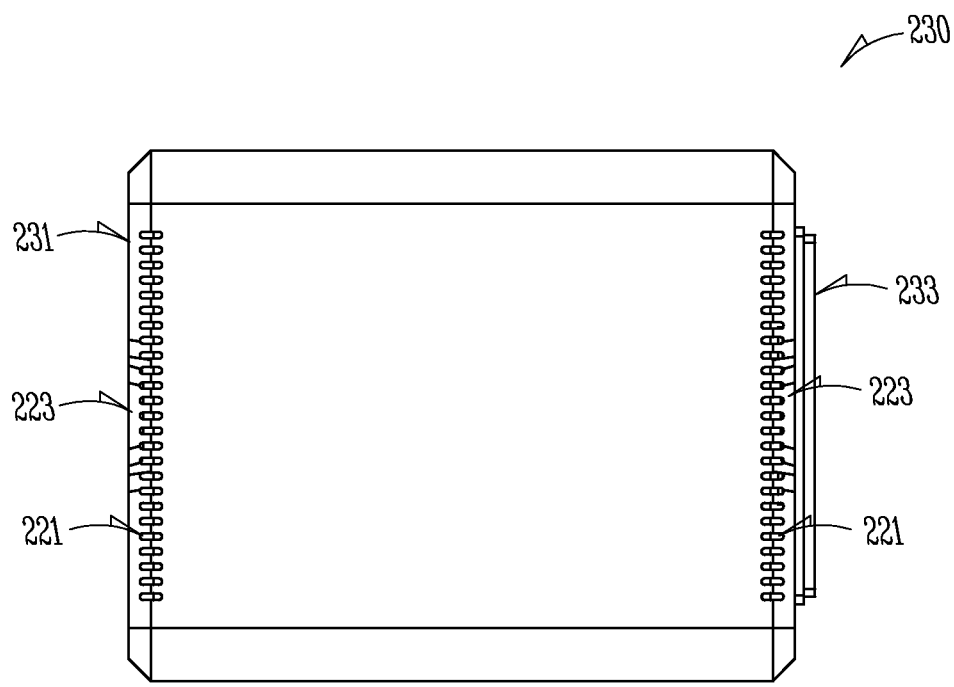

FIG. 2D is a side elevational-view drawing 230, as viewed from the right side 205 of the exemplary reader hub 200 of FIG. 2A. The side elevational-view drawing 230 includes a top portion 231 and a base portion 233, described in more detail with reference to FIG. 2E, below.

Figure 2E:
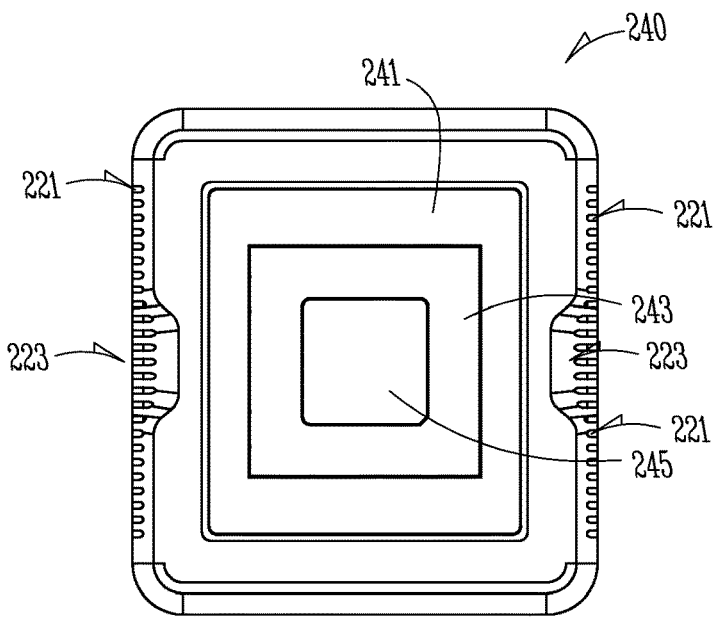

FIG. 2E is a bottom view 240 of the exemplary reader hub 200 of FIG. 2A and is shown to include a compliant-region mat 241, a magnetic material 243, and an optional compliance-label 245. Each of the compliant-region mat 241 and the magnetic material 243 may comprise the same or similar materials as the compliant-region mat 117 and the magnetic material 119 described above with reference to FIG. 1. Further each of the compliant-region mat 241, the magnetic material 243, and the optional compliance-label 245 may comprise the same or similar functions as the compliant-region mat 117, the magnetic material 119, and the optional compliance-label 121 of FIG. 1.

In other embodiments, not shown explicitly but readily understandable to a skilled artisan, the compliant-region mat 241 and the magnetic material 243 may alternatively be mounted on other portions of the exemplary reader hub 200. In other embodiments, the compliant-region mat 241 and the magnetic material 243 may be coupled to more than one of the faces of the exemplary reader hub 200. For example, the compliant-region mat 241 and the magnetic material 243 may be formed on one or more of, for example, four faces (e.g., the left-side portion 203, the right-side portion 205, the top portion 231, and the base portion 233) of the exemplary reader hub 200. In still other embodiments, the magnetic material 243 may be mounted on one side or face of the exemplary reader hub 200 and a metal plate or other ferrous material may be mounted on an opposing face. For example, the magnetic material 243 may be mounted on the left-side portion 203 of the exemplary reader hub 200 while a metal plate (not shown but similar to the optional metal plate 115 of FIG. 1) on the right-side portion 205 so that two reader hubs 200 may be located adjacent one another and be adhered magnetically one to the other.

Figure 2F:
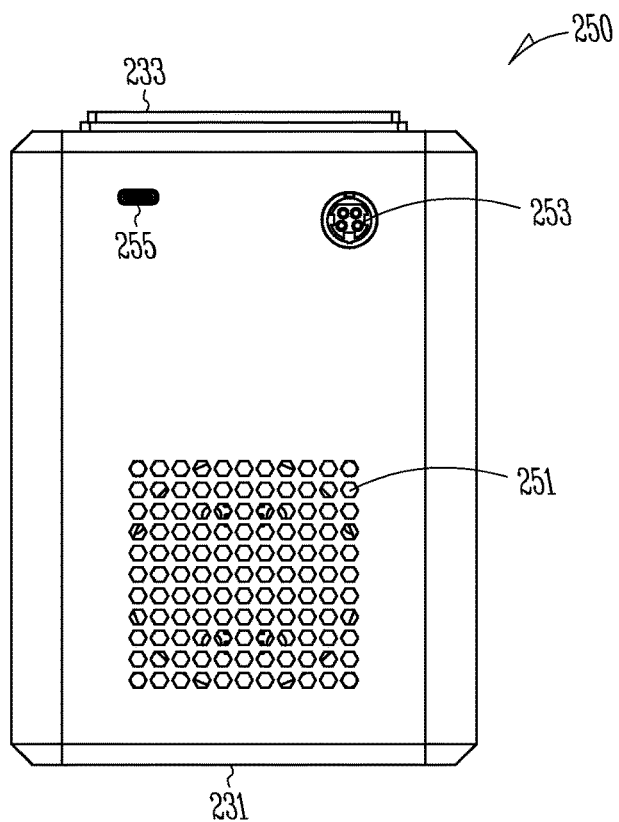

With reference now to FIG. 2F, a back elevational-view 250 of the exemplary reader hub 200 of FIG. 2A is shown. The back elevational-view 250 is shown to include a number of through-hole cooling vents 251, a power-supply adapter plug 253 to provide AC or DC power to the exemplary reader hub 200, and an electrical connector through which a computer or other digital device may be electrically coupled to each dual card-reader circuit-board 103 within inserted ones of the digital-card readers 100. A cooling fan (not shown) may be mounted in proximity to the through-hole cooling vents 251 to aid in convective cooling of the inserted ones of the digital-card readers 100.

Based upon reading and understanding the disclosure provided herein, a person of ordinary skill in the art will recognize a number of other configurations of the digital-card reader 100 and the exemplary reader hub 200 that are possible. Each of the other possible configuration are within a scope of the appended claims. Therefore, the description above includes illustrative examples, devices, and systems that embody the disclosed subject matter. In the description, for purposes of explanation, numerous specific details were set forth in order to provide an understanding of various embodiments of the disclosed subject matter. It will be evident, however, to those of ordinary skill in the art that various embodiments of the subject matter may be practiced without these specific details. Further, well-known structures, materials, and techniques have not been shown in detail, so as not to obscure the various illustrated embodiments.

As used herein, the term "or" may be construed in an inclusive or exclusive sense. Further, other embodiments will be understood by a person of ordinary skill in the art upon reading and understanding the disclosure provided. Further, upon reading and understanding the disclosure provided herein, the person of ordinary skill in the art will readily understand that various combinations of the techniques and examples provided herein may all be applied in various combinations.

As used herein, terms related to electrically-conductive elements or electrically-coupled elements broadly includes all types of electrical routing features configured to route electrical signals to or from various regions within a device or to regions of external devices (not shown). Thus, the term electrically-conductive elements includes, for example, internal electrical routing features and inter-device electrical connection and electrical routing features known in the art.

The term "substantially" or "about" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

Although various embodiments are discussed separately, these separate embodiments are not intended to be considered as independent techniques or designs. As indicated above, each of the various portions may be inter-related and each may be used separately or in various combinations.

Consequently, many modifications and variations can be made, as will be apparent to the person of ordinary skill in the art upon reading and understanding the disclosure provided herein. Functionally equivalent methods and devices within the scope of the disclosure, in addition to those enumerated herein, will be apparent to a skilled artisan from the foregoing descriptions. Portions and features of some embodiments may be included in, or substituted for, those of others. Such modifications and variations are intended to fall within a scope of the appended claims. Therefore, the present disclosure is to be limited only by the terms of the appended claims, along with the full scope of equivalents to which such claims are entitled. It is also to be understood that the terminology used herein is for the purpose of describing particular embodiments only and is not intended to be limiting.

The Abstract of the Disclosure is provided to allow the reader to quickly ascertain the nature of the technical disclosure. The abstract is submitted with the understanding that it will not be used to interpret or limit the claims. In addition, in the foregoing Detailed Description, it may be seen that various features may be grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

The invention claimed is:

1. A digital-card reader, comprising:
a card-reader frame having a circuit board including at least one memory-card reader configured to perform data transfer operations including at least one operation of reading from a memory card and writing to the memory card;
a magnetic material coupled to at least one face of the card-reader frame; and
a compliant-region mat coupled to the at least one face of the card-reader frame and positioned proximate to the magnetic material, the compliant-region mat being approximately the same thickness as the magnetic material, a combination of the magnetic material and the compliant-region mat being configured such that the magnetic material is to compress the compliant-region mat to increase friction against a mounting surface so as to at least partially overcome insertion forces associated with inserting the memory card into the digital-card reader, thereby reducing or eliminating lateral movement of the digital-card reader with reference to the mounting surface.

2. The digital-card reader of claim 1, wherein the compliant-region mat surrounds the magnetic material.

3. The digital-card reader of claim 1, wherein the compliant-region mat comprises at least one material selected from materials including flexible elastomers, rubbers, polymers, and plastics.

4. The digital-card reader of claim 1, wherein a Shore A-scale hardness of the compliant-region mat is in a range of about 40 to about 65.

5. The digital-card reader of claim 1, wherein a Shore A-scale hardness of the compliant-region mat is in a range of about 50 to about 70.

6. The digital-card reader of claim 1, wherein a Shore A-scale hardness of the compliant-region mat is in a range of about 60.

7. The digital-card reader of claim 1, wherein a magnetic-flux density of the magnetic material is in a range of about 100 Gauss to about 10,000 Gauss.

8. The digital-card reader of claim 1, wherein a magnetic-flux density of the magnetic material is in a range of about 1,000 Gauss to about 5,000 Gauss.

9. The digital-card reader of claim 1, wherein a magnetic-flux density of the magnetic material is in a range of about 2,250 Gauss to about 2, 750 Gauss.

10. A method comprising:
determining a value of an insertion force of a memory card;
forming a compliant-region mat and a magnetic material in proximity to the compliant-region mat on a face of a digital-card reader;
determining a value of coefficient of friction between the digital-card reader and the value of insertion force of the memory card for a selected surface to which the face of the digital-card reader is to be mounted magnetically; and
selecting a durometer value of the compliant-region mat.

11. The method of claim 10, further comprising selecting a value of magnetic flux density of the magnetic material that, when combined with the durometer value of the compliant-region mat, achieves at least the value of the coefficient of friction.

12. A reader hub, comprising:
a magnetic material coupled to at least one face of the reader hub;

a compliant-region mat coupled to the at least one face of the reader hub and positioned proximate to the magnetic material, a combination of the magnetic material and the compliant-region mat being configured such that the magnetic material is to compress the compliant-region mat to increase friction against a mounting surface so as to at least partially overcome insertion forces associated with inserting a memory card into one or more of a plurality of digital-card readers mounted within the reader hub, thereby reducing or eliminating lateral movement of the reader hub with reference to the mounting surface; and a plurality of openings configured to accept a corresponding number of the plurality of the digital-card readers.

13. The reader hub of claim 12, wherein the mounting surface is a face of a second reader hub.

14. A digital-card reader, comprising:

a card-reader frame having a circuit board including at least one memory-card reader configured to perform data transfer operations including at least one operation of reading from a memory card and writing to the memory card;

a magnetic material coupled to at least one face of the card-reader frame; and a compliant-region mat coupled to the at least one face of the card-reader frame and positioned proximate to the magnetic material, the compliant-region mat having a thickness greater than a thickness of the magnetic material, a combination of the magnetic material and the compliant-region mat being configured such that the magnetic material is to compress the compliant-region mat to increase friction against a mounting surface so as to at least partially overcome insertion forces associated with inserting the memory card into the digital-card reader, thereby reducing or eliminating lateral movement of the digital-card reader with reference to the mounting surface.

15. The digital-card reader of claim 14, wherein the compliant-region mat is thicker than the magnetic material by about 0.1 mm to about 0.5 mm.

16. The digital-card reader of claim 14, wherein the compliant-region mat is thicker than the magnetic material by about 0.5 mm to about 1 mm.

17. The digital-card reader of claim 14, wherein the compliant-region mat is thicker than the magnetic material by about 1 mm to about 2 mm.

18. The digital-card reader of claim 14, wherein the compliant-region mat is thicker than the magnetic material by greater than 2 mm.

* * * * *